(12) United States Patent
Ogawa et al.

(10) Patent No.: US 8,277,994 B2
(45) Date of Patent: Oct. 2, 2012

(54) FUEL CELL SYSTEM

(75) Inventors: Jumpei Ogawa, Oyama (JP); Chihiro Wake, Utsunomiya (JP); Takahisa Ogino, Utsonomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 125 days.

(21) Appl. No.: 12/868,335

(22) Filed: Aug. 25, 2010

(65) Prior Publication Data

US 2011/0053026 A1 Mar. 3, 2011

(30) Foreign Application Priority Data

Aug. 25, 2009 (JP) .................................. 2009-194561

(51) Int. Cl.
*H01M 8/04* (2006.01)
(52) U.S. Cl. .................... 429/433; 429/444; 429/456
(58) Field of Classification Search .................. 429/429, 429/428, 513, 414, 416, 431, 456, 444, 433
See application file for complete search history.

(56) References Cited

U.S. PATENT DOCUMENTS

| | | | |
|---|---|---|---|
| 2002/0071975 A1* | 6/2002 | Shimazu | 429/17 |
| 2002/0146602 A1* | 10/2002 | Abe et al. | 429/13 |
| 2006/0046106 A1* | 3/2006 | Yu et al. | 429/13 |
| 2006/0088738 A1* | 4/2006 | Aso | 429/9 |
| 2006/0099466 A1 | 5/2006 | Wake et al. | |
| 2008/0182138 A1 | 7/2008 | Salvador et al. | |
| 2008/0280174 A1 | 11/2008 | Ogawa et al. | |
| 2009/0104480 A1* | 4/2009 | Machuca et al. | 429/17 |

FOREIGN PATENT DOCUMENTS

| | | | |
|---|---|---|---|
| EP | 1589600 A2 | | 10/2005 |
| JP | 2006-024470 A | | 1/2006 |
| JP | 2006324058 A | * | 11/2006 |
| JP | 2006-331877 A | | 12/2006 |
| JP | 2007-066717 A | | 3/2007 |
| JP | 2007-157492 A | | 6/2007 |
| JP | 2007-184199 A | | 7/2007 |
| JP | 2008-257984 A | | 10/2008 |
| JP | 2008-277203 A | | 11/2008 |
| JP | 2009-076261 A | | 4/2009 |
| JP | 2009-123466 A | | 6/2009 |

OTHER PUBLICATIONS

Machine Translation of: JP 2006/324058 A, Igarahashi et al., Nov. 30, 2006.*
Japanese Office Action dated Jul. 5, 2011, issued in corresponding Japanese Patent Application No. 2009-194561.
European Search Report dated Dec. 6, 2010, issued in corresponding European Patent Application No. 10174020.7.

* cited by examiner

*Primary Examiner* — Jonathan Crepeau
*Assistant Examiner* — Kenneth Douyette
(74) *Attorney, Agent, or Firm* — Westerman, Hattori, Daniels & Adrian, LLP

(57) ABSTRACT

A fuel cell system comprising: an anode gas flow path supplied with an anode gas; a cathode gas flow path supplied with a cathode gas; a fuel cell generating electricity by the anode gas being supplied to the anode gas flow path and the cathode gas being supplied to the cathode gas flow path; an anode gas supplying unit supplying the anode gas to the anode gas flow path; a blowdown valve ejecting fluid from inside the anode gas flow path towards an exterior; and a control unit which controls the anode gas supplying unit and the blowdown valve, supplies the anode gas from the anode gas supplying unit to the anode gas flow path, and performs a periodic fluid substitution by opening the blowdown valve periodically, wherein the control unit comprises a low temperature condition determination unit.

8 Claims, 8 Drawing Sheets

FUEL CELL SYSTEM

The present application claims priority on Japanese Patent Application No. 2009-194561, filed Aug. 25, 2009, the content of which is incorporated herein by reference.

BACKGROUND OF THE INVENTION

1. Field of the Invention

The present invention relates to a fuel cell system.

2. Description of the Related Art

According to a well known fuel cell equipped on vehicles, for example, a membrane electrode assembly is created by flanking a solid polymer electrolyte membrane from both sides with an anode electrode and a cathode electrode, a tabular unitary fuel cell (hereinafter referred to as a unit cell) is created by placing a pair of separators on both sides of the membrane electrode assembly, and a fuel cell stack (hereinafter referred to as a fuel cell) is created by stacking a plurality of unit cells. According to such a fuel cell, a hydrogen gas is supplied as an anode gas (fuel gas) between the anode electrode and the separator. At the same time, air is supplied as a cathode gas (oxidant gas) between the cathode electrode and the separator. As a result, a hydrogen ion, created by a catalytic reaction at the anode electrode, moves to the cathode electrode by passing through the solid polymer electrolyte membrane, conducts an electrochemical reaction at the cathode electrode with oxygen in the air, and thereby generates electricity. In accordance with this electric power generation, water is created inside the fuel cell.

A number of problems are associated with a fuel cell system comprised with such a fuel cell when, for example, the fuel cell system is used at an environment below freezing point. For example, when the fuel cell is exposed to a low temperature environment when the fuel cell system is not operating, there is a possibility that remaining water will freeze at the surface of an MEA (Membrane Electrode Assembly) or inside the MEA comprising the fuel cell, thereby reducing the effective reaction area of the MEA. When the effective reaction area of the MEA is shrunk in this way, and the generation of electricity begins by allowing the fuel cell to generate electricity due to the fact that the OCV (Open Circuit Voltage) of the fuel cell became greater than or equal to a predetermined OCV, problems are created such that a gas deficiency occurs at the MEA, and the electric-generating capacity and the stability of the fuel cell declines.

Therefore, in order to solve such a problem, a technology is suggested so that, an ECU is provided to determine whether or not a system will be activated at a low temperature, and when it is determined that a start-up will be made at low temperature, the ECU will try to substitute the interior of the anode gas flow path with fresh hydrogen by opening the purge valve and increasing the total purge amount of the gas that will be purged, thereby increasing the hydrogen concentration in the anode gas flow path (see, for example, Japanese Unexamined Patent Application, First Publication, No. 2008-277203 (hereinafter referred to as "Patent Document 1")).

Although the problems described above are solved by a fuel cell system according to Patent Document 1, another problem still persists. For example, when the fuel cell is warm when the start-up is made at low temperature, but the anode gas flow path is not fully warmed up, generated water may freeze in the anode gas flow path while electricity is being generated or while the system is soaking (i.e., when the system is left while not being activated), thereby closing the anode gas flow path, making it difficult to discharge the generated water.

SUMMARY OF THE INVENTION

The present invention is made considering the problems described above. Accordingly, an object of the present invention is to provide a fuel cell system which can prevent the anode gas flow path from freezing.

(1) Namely, a fuel cell system according to an aspect of the present invention comprises an anode gas flow path supplied with an anode gas; a cathode gas flow path supplied with a cathode gas; a fuel cell generating electricity by the anode gas being supplied to the anode gas flow path and the cathode gas being supplied to the cathode gas flow path; an anode gas supplying unit supplying the anode gas to the anode gas flow path; a blowdown valve ejecting fluid from inside the anode gas flow path towards an exterior; and a control unit which controls the anode gas supplying unit and the blowdown valve, supplies the anode gas from the anode gas supplying unit to the anode gas flow path, and performs a periodic fluid substitution by opening the blowdown valve periodically. Here, the blowdown valve comprises at least a first blowdown valve provided in the anode gas flow path and a second blowdown valve provided at a lower stream side of the first blowdown valve. In addition, the control unit comprises a low temperature condition determination unit determining whether or not a low temperature condition is present after the fuel cell is activated. When the low temperature condition determination unit determines that a low temperature condition is present, fluid substitution within the anode gas flow path is performed by increasing an amount of fluid ejected from the first blowdown valve or the second blowdown valve to be greater than an amount of fluid ejected during the periodic fluid substitution execution unit.

(2) In addition, the fuel cell system may be configured as follows: when the low temperature condition determination unit determines that a low temperature condition is present, the control unit performs a control so that an opening time of the blowdown valve per opening is longer than an opening time during the periodic fluid substitution execution unit.

(3) In addition, the fuel cell system may be configured as follows: when the low temperature condition determination unit determines that a low temperature condition is present, the control unit performs a control so that a time interval between a consecutive opening of the blowdown valve is shorter than a time interval between a consecutive opening during the periodic fluid substitution.

(4) In addition, the fuel cell system may be configured as follows: the fuel cell system further comprises a dilution unit diluting a concentration of the anode gas ejected from the blowdown valve; and a cathode gas dilution flow path supplying the cathode gas to the dilution unit. Here, the control unit performs a control so that a flow volume of the cathode gas supplied to the cathode gas dilution flow path is increased according to an increase in the amount of the amount of fluid ejected from the first blowdown valve or the second blowdown valve.

(5) In addition, the fuel cell system may be configured as follows: the control unit comprises a freeze determination unit determining whether the first blowdown valve is in a frozen state. When the freeze determination unit determines that the first blowdown valve is not in a frozen state, fluid substitution is performed within the anode gas flow path by increasing the amount of fluid ejected from the first blowdown valve.

(6) In addition, the fuel cell system may be configured as follows: the control unit performs fluid substitution within the anode gas flow path by increasing the amount of fluid ejected from the first blowdown valve after restricting the periodic fluid substitution from the second blowdown valve.

(7) In addition, the fuel cell system may be configured as follows: the control unit performs fluid substitution within the anode gas flow path by increasing an amount of fluid ejected from the second blowdown valve after restricting the periodic fluid substitution from the first blowdown valve.

(8) In addition, the fuel cell system may be configured as follows: the control unit comprises an elevated temperature condition determination unit determining a warm-up condition of the anode gas flow path using a start-up temperature of the fuel cell and an electric generation current accumulation value of the fuel cell. After the amount of fluid ejected is increased and when the elevated temperature condition determination unit determines that a temperature of the anode gas flow path has increased to be greater than or equal to a predetermined temperature, the control unit stops an increase in an amount of fluid ejected.

According to the fuel cell system described in (1) above, a configuration is made so that, when it is determined that the fuel cell system is in a low temperature condition, a fluid is discharged from the blowdown valve. Here, the amount of fluid discharged from the blowdown valve is greater than the amount of fluid being discharged at the time of periodic fluid substitution. In addition, the temperature of the fluid discharged from the blowdown valve is higher than the temperature of the surrounding atmosphere. As a result, it is possible to enhance the capability of warming up the anode gas flow path. Thus, it is possible to prevent the anode gas flow path from freezing.

According to the fuel cell system described in (2) above, a configuration is made so that, when it is determined that the fuel cell system is in a low temperature condition, the time during which the blowdown valve is opened when the liquid is discharged is longer than the time during which the blowdown valve is opened when the periodic fluid substitution is being made. In this way, it is possible to increase the amount of liquid which is discharged each time the blowdown valve is opened. Therefore, it is possible to enhance the capability of warming up the anode gas flow path. In this way, it is possible to prevent the anode gas flow path from freezing.

According to the fuel cell system described in (3) above, a configuration is made so that, when it is determined that the fuel cell system is in a low temperature condition, the interval at which the blowdown valve is opened when the liquid is discharged is shorter than the interval at which the blowdown valve is opened when the period fluid substitution is being made. As a result, it is possible to prolong the amount of time during which the blowdown valve is opened per unit of time. Thus, the amount of liquid that is discharged can be increased. Therefore, it is possible to enhance the capability of warming up the anode gas flow path. In this way, it is possible to prevent the anode gas flow path from freezing.

According to the fuel cell system described in (4) above, when the amount of liquid being discharged increases, the concentration of the anode gas in the dilution device may increase. Accordingly, a cathode gas is provided from the cathode gas dilution flow path to the dilution device. Consequently, the anode gas flow path is prevented from freezing. Moreover, it is possible to reliably prevent the concentration of the anode gas inside the dilution device from increasing.

According to the fuel cell system described in (5) above, a configuration is made so that a fluid substitution is performed only when the first blowdown valve can function reliably. In other words, a configuration is made so that a fluid substitution is performed when the first blowdown valve is used to perform a fluid substitution inside the anode gas flow path, a determination is made regarding whether or not the first blowdown valve is frozen, and when the first blowdown valve is not frozen. Consequently, it is possible to prevent the first blowdown valve from being damaged. At the same time, liquid can be reliably discharged from the first blowdown valve, thereby preventing any freezing.

According to the fuel cell system described in (6) above, when the first blowdown valve is used to perform a fluid substitution inside the anode gas flow path, the fluid substitution is performed after the periodic fluid substitution from the second blowdown valve is restrained. As a result, the amount of liquid discharged from the first blowdown valve may be increased with reliability. Therefore, it is possible to increase the capacity of warming up the anode gas flow path and the first blowdown valve. Hence, it is possible to prevent the anode gas flow path and the first blowdown valve from freezing.

According to the fuel cell system described in (7) above, when a fluid substitution inside the anode flow path is performed using the second blowdown valve, the fluid substitution is performed after the periodic fluid substitution from the first blowdown valve is restrained. As a result, the amount of liquid discharged from the second blowdown valve can be increased with reliability. Therefore, it is possible to increase the capacity of warming up the anode gas flow path and the second blowdown valve. Hence, it is possible to prevent the anode gas flow path and the second blowdown valve from freezing.

According to the fuel cell system described in (8) above, the amount of liquid discharged is increased until the elevated temperature condition determination unit determines that the temperature of the anode gas flow path has risen to greater than or equal to a predetermined temperature. Therefore, the anode gas flow path can be warmed up with reliability. At the same time, the anode gas flow path can be prevented from freezing.

DETAILED DESCRIPTION OF THE PREFERRED EMBODIMENTS

First Embodiment

Hereunder, a first embodiment of the present invention is described with reference to FIGS. 1-6. The present embodiment is described under the assumption that a fuel cell system is equipped on a vehicle.

Figure 1:
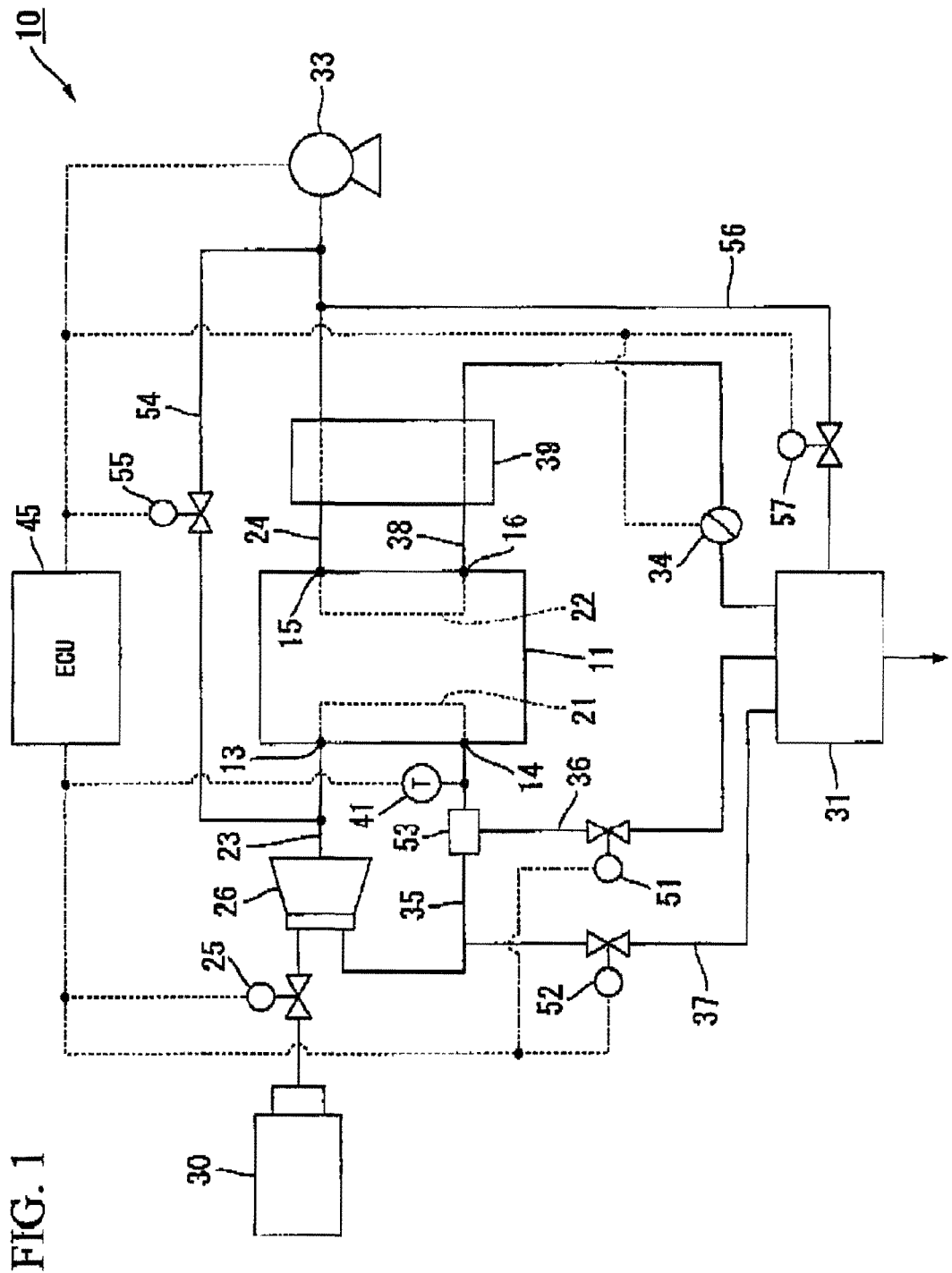
FIG. 1 is a configuration diagram of a fuel cell system according to an aspect of the present invention.

FIG. 1 is a configuration diagram of a fuel cell system according to the present invention. As shown in FIG. 1, a fuel cell 11 of a fuel cell system 10 is a solid polymer membrane type fuel cell which generates electricity based on an electrochemical reaction between an anode gas such as hydrogen and a cathode gas such as air. An anode gas supplying tube 23 is connected to an anode gas supplying communication hole 13 formed on the fuel cell 11 (at an entrance side of an anode gas flow path 21). A hydrogen tank 30 is connected to an end part of an upper stream of the anode gas supplying tube 23. Further, a cathode gas supplying tube 24 is connected to a cathode gas supplying communication hole 15 formed on the fuel cell 11 (at an entrance side of a cathode gas flow path 22). An air compressor 33 is connected to an end part of an upper stream of the cathode gas supplying tube 24. Further, an anode offgas discharge pipe 35 is connected to an anode offgas discharging communication hole 14 formed on the fuel cell 11 (at an outlet side of the anode gas flow path 21). In addition, a cathode offgas discharge pipe 38 is connected to a cathode offgas discharging communication hole 16 (at an outlet side of the cathode gas flow path 22).

Further, hydrogen gas provided from the hydrogen tank 30 to the anode gas supplying tube 23 is depressurized by a regulator (not diagramed), then passes through an ejector 26, and is supplied to the anode gas flow path 21 of the fuel cell 11. Further, an electromagnetic-driving type electromagnetic valve 25 is provided near a lower stream side of the hydrogen tank 30. In this way, a configuration is made to shield a supply of hydrogen gas from the hydrogen tank 30.

In addition, the anode offgas discharge pipe 35 is connected to the ejector 26. Thus, a configuration is made so that an anode offgas which passed through the fuel cell 11 and was ejected may be reused as an anode gas of the fuel cell 11. Furthermore, two pipes are provided partway through the anode offgas discharge pipe 35 while being branched out. Namely, a drain ejection pipe 36 (which also may be referred to as a drain discharge pipe 36) and a purge gas ejection pipe 37 (which may also be referred to as a purge gas discharge pipe 37) are provided.

The drain ejection pipe 36 and the purge gas ejection pipe 37 are all connected to a dilution box 31 at a lower stream of each of the drain ejection pipe 36 and the purge gas ejection pipe 37. An electromagnetic-driving type drain valve 51 is provided on the drain ejection pipe 36. An electromagnetic-driving type purge valve 52 is provided on the purge gas ejection pipe 37. Further, the diameter of the purge gas ejection pipe 37 is larger than the diameter of the drain ejection pipe 36. Further, a catch tank 53 is provided at a branching point between the anode offgas discharge pipe 35 and the drain ejection pipe 36 as a gas-liquid separator.

Next, air (cathode gas) is compressed by the air compressor 33. After the air passes through the cathode gas supplying tube 24, the air is supplied to the cathode gas flow path 22 of the fuel cell 11. After oxygen in the air is used in electric power generation as an oxidant, the oxygen is discharged to the cathode offgas discharge pipe 38 from the fuel cell 11 as a cathode offgas. The cathode offgas discharge pipe 38 is connected to the dilution box 31. Thereafter, a discharge is made outside the vehicle. Incidentally, the cathode offgas discharge pipe 38 comprises a back pressure valve 34. In addition, a humidifier 39 is bridged between the cathode gas supplying tube 24 and the cathode offgas discharge pipe 38. As a result of the humidifier 39, the cathode gas is humidified by the movement of moisture included in the cathode offgas.

Further, the cathode gas supplying tube 24 connecting the air compressor 33 and the fuel cell 11 is configured so that the pipe is branched, and an end of a scavenging gas injection pipe 54 is connected. The other end of the scavenging gas injection pipe 54 is connected between the fuel cell 11 and the ejector 26 of the anode gas supplying tube 23. In other words, the air supercharged by the air compressor 33 can be supplied to the anode gas flow path 21 of the fuel cell 11. Incidentally, an electromagnetic driving type electromagnetic valve 55 is provided on the scavenging gas injection pipe 54. Thus, a configuration is made so that the supply of air from the air compressor 33 can be shielded.

Further, the cathode gas supplying tube 24 connecting the air compressor 33 and the fuel cell 11 is configured so that the pipe is branched, and an end of a dilution gas supplying pipe 56 is connected. The other end of the dilution gas supplying pipe 56 is connected to the dilution box 31. In other words, the air pressurized by the air compressor 33 is directly supplied to the dilution box 31. Further, the dilution gas supplying pipe 56 comprises an electromagnetic-driving type electromagnetic valve 57. Thus, a configuration is made so that the supply of air from the air compressor 33 can be shielded.

Here, a temperature sensor 41 is provided immediately adjacent to (the lower stream side of) the anode offgas discharging communication hole 14 of the anode offgas discharge pipe 35. For example, according to the temperature sensor 41, it is possible to detect a temperature which is approximately the same as the temperature of the interior of the fuel cell 11. The detection result (i.e., a sensor output) of the temperature sensor 41 is transmitted to a control device (i.e., an ECU) 45. Thus, a configuration is made so that it is determined whether or not each type of control (described later) will be carried out, based on the detection result.

Figure 2:
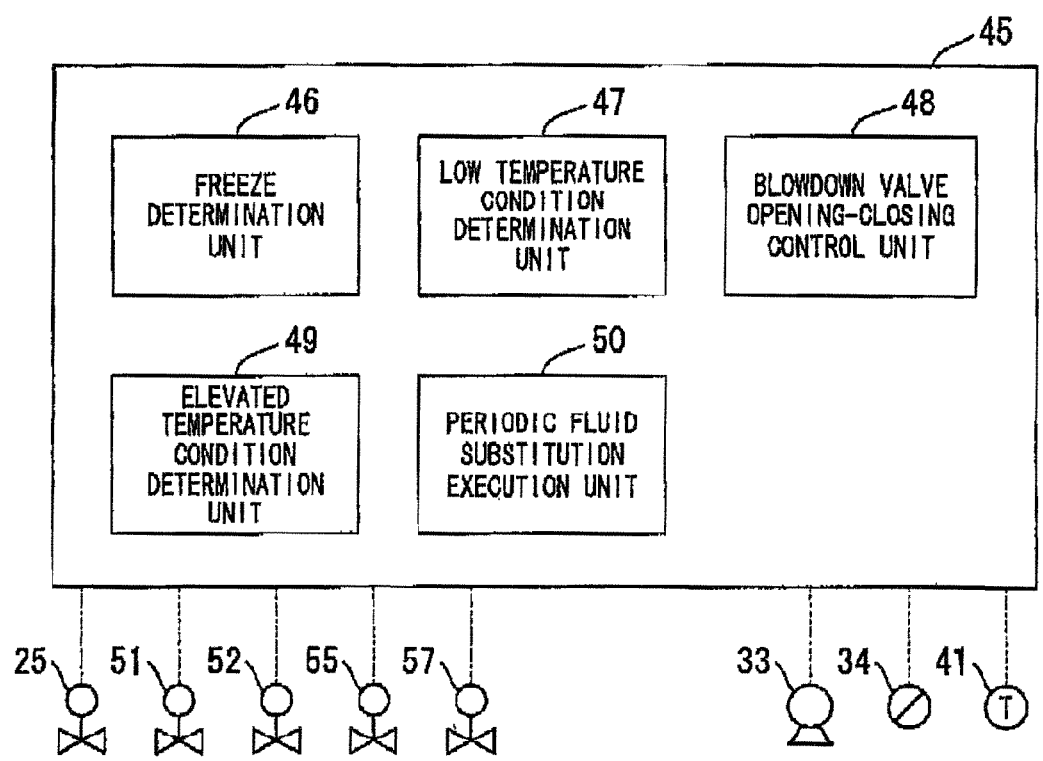
FIG. 2 is a block diagram of a control device according to an aspect of the present invention.

FIG. 2 is a block diagram of the control device 45. As indicated in FIG. 2, the control device 45 comprises a freeze determination unit 46, a low temperature condition determination unit 47, a blowdown valve opening-closing control unit 48, an elevated temperature condition determination unit 49, and a periodic fluid substitution execution unit 50. The freeze determination unit 46 determines whether or not the drain valve 51 is frozen. The low temperature condition determination unit 47 determines whether or not the anode offgas discharge pipe 35 and the like is in a low temperature condition. Water generated by the fuel cell 11 passes through the anode offgas discharge pipe 35. The blowdown valve opening-closing control unit 48 controls the opening and closing operations of the drain valve 51 and the purge valve 52. The elevated temperature condition determination unit 49 determines whether or not the warming up of the drain ejection pipe 36 has been completed. The periodic fluid substitution execution unit 50 performs a periodic fluid substitution, while the fuel cell system 10 is operating, by opening the drain valve 51 and the purge valve 52.

Here, a "periodic fluid substitution" (hereinafter may also be referred to as a "periodic fluid substitution") refers to a method of increasing the hydrogen concentration at the anode side by periodically opening the drain valve 51 and the purge valve 52 to eject the anode offgas and the generated water while supplying hydrogen from the hydrogen tank 30 to the anode gas supplying tube 23 when the fuel cell system 10 is operating normally, i.e., when the fuel cell system 10 is running, and the warming up of the anode offgas discharge pipe 35, the drain ejection pipe 36, and the purge gas ejection pipe 37 has been completed. The timing with which the drain valve 51 and the purge valve 52 is opened may be set by the amount of water stored in the catch tank 53, and may also be set by the electric current accumulation value when electricity is generated.

In addition, a control device 45 is configured so that, according to an output required by the fuel cell 11, the electromagnetic valve 25 is controlled, and a predetermined amount of hydrogen gas is supplied to the fuel cell 11 from the hydrogen tank 30. Further, according to an output required by the fuel cell 11, the control device 45 drives the air compressor 33, thus supplying a predetermined amount of air to the fuel cell 11, and thereby controlling the back pressure valve 34 so as to adjust the supplying pressure of the air supplied to the cathode gas flow path 22.

Further, a configuration is made so that the electromagnetic valve 55 of the scavenging gas injection pipe 54 is controlled in order to supply a predetermined amount of air when the anode gas supplying tube 23 and the anode offgas discharge pipe 35 and the like are cleaned. Moreover, in order to prevent the hydrogen concentration of the dilution box 31 from increasing, a configuration is made so that a predetermined amount of air is supplied by controlling the electromagnetic valve 57 of the dilution gas supplying pipe 56.

[Draining and Purging Method of a Fuel Cell System]

Next, a draining and purging method of a fuel cell system 10 according to the present embodiment is described.

Figure 3:
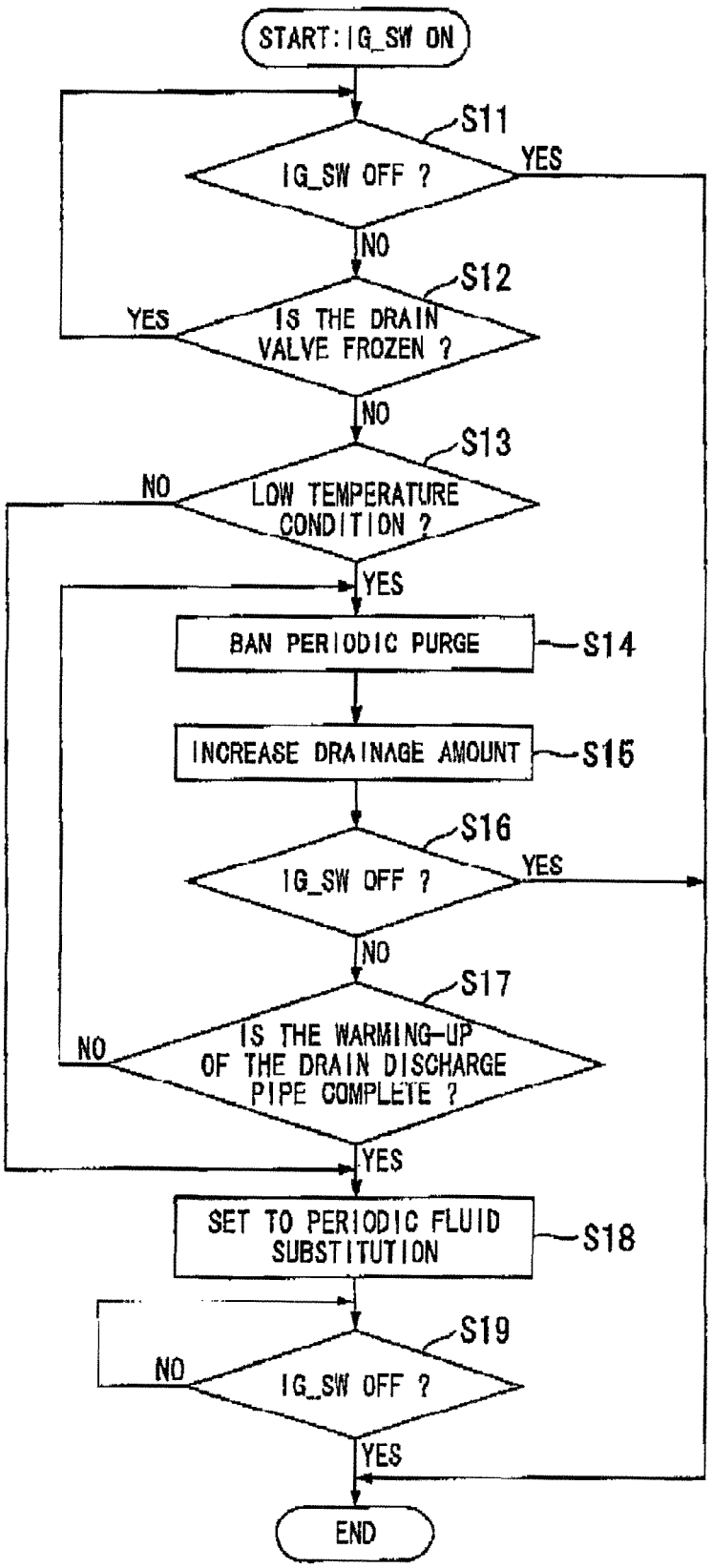
FIG. 3 is a flow chart indicating a draining and purging method of a fuel cell system according to an aspect of the present invention.

FIG. 3 is a flow chart indicating a draining and purging method of a fuel cell system 10.

As indicated in FIG. 3, the flow chart starts from a condition in which an ignition switch (not diagrammed) is turned on. The ignition switch is a seizing signal of the fuel cell system 10.

In step S11, it is determined whether or not the ignition switch has been turned off. When the ignition switch is turned off, the procedure ends. When the ignition switch is not turned off, the procedure moves on to step S12.

In step S12, the freeze determination unit 46 of the control device 45 determines whether or not the drain valve 51 is frozen. When it is determined that the drain valve 51 is frozen, the procedure returns to step S11. When it is determined that the drain valve 51 is not frozen, the procedure moves on to step S13. Whether the drain valve 51 is frozen or not is determined, for example, by performing an experiment in advance to figure out a temperature at which the drain valve 51 freezes, thereby preparing a temperature value which is used to determine whether or not the drain valve 51 has frozen. The determination of whether or not the drain valve 51 has frozen is made based on the temperature detected by the temperature sensor 41.

In step S13, the low temperature condition determination unit 47 of the control device 45 determines whether or not the fuel cell system 10 is exposed to a low temperature condition. When it is determined that the fuel cell system 10 is in a low temperature condition the procedure moves on to step S14. When it is determined that the fuel cell system 10 is not in a low temperature condition, the procedure moves on to step S18.

Here, determining that the fuel cell system 10 is in a low temperature condition refers to determining that a freezing of generated water, discharged from the fuel cell 11 immediately after the start up of the fuel cell system 10, may occur at the anode offgas discharge pipe 35, the drain ejection pipe 36, and the purge gas ejection pipe 37 when the fuel cell system 10 is activated as usual at this state. For example, if an experiment performed in advance indicates that 41° C. is the temperature, 41° C. is set to be the temperature value used for the determination. When it is determined that the fuel cell system 10 is in a low temperature condition, an instruction by the blowdown valve opening-closing control unit 48 of the control device 45 sets the control of the opening and closing operation of the drain valve 51 and the purge valve 52 to a control which is different from the periodic fluid substitution.

In particular, in step S14, the periodic purge is prohibited, and the procedure moves on to step S15. In other words, the purge valve 52 is kept closed so that a purge operation cannot be performed.

Figure 4:
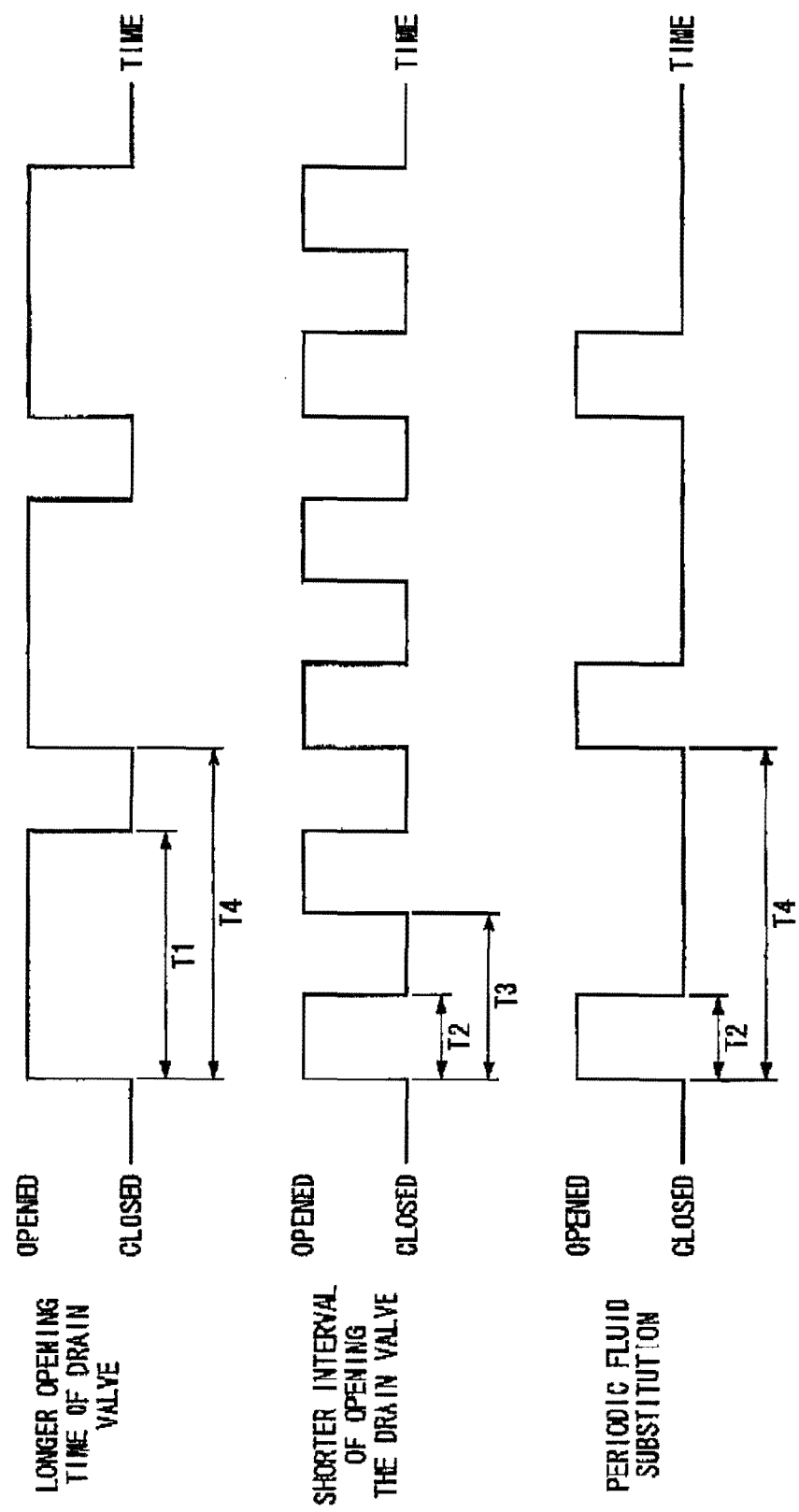
FIG. 4 is a time chart illustrating a timing of an opening and closing operating of a drain valve according to an aspect of the present invention.

In step S15, the amount of drainage discharged from the drain ejection pipe 36 per unit of time is increased. In particular, as shown in FIG. 4, the opening time T1 of the drain valve 51 per opening may be set to be longer than the opening time T2 during a periodic fluid substitution. As another possibility, the opening time of the drain valve 51 per opening may be set to be equal to the opening time T2 during a periodic fluid substitution, while the interval T3 of each opening of the valve may be set to be shorter than the opening time T4 during a periodic fluid substitution. The generated water is a warm water with a temperature of approximately 70° C. when the generated water is discharged from the fuel cell 11. Therefore, by increasing the amount of drainage, the warming-up capacity of the drain ejection pipe 36 is enhanced. Thus, in a short amount of time, it is possible to prevent the drain ejection pipe 36 from freezing.

Figure 5:
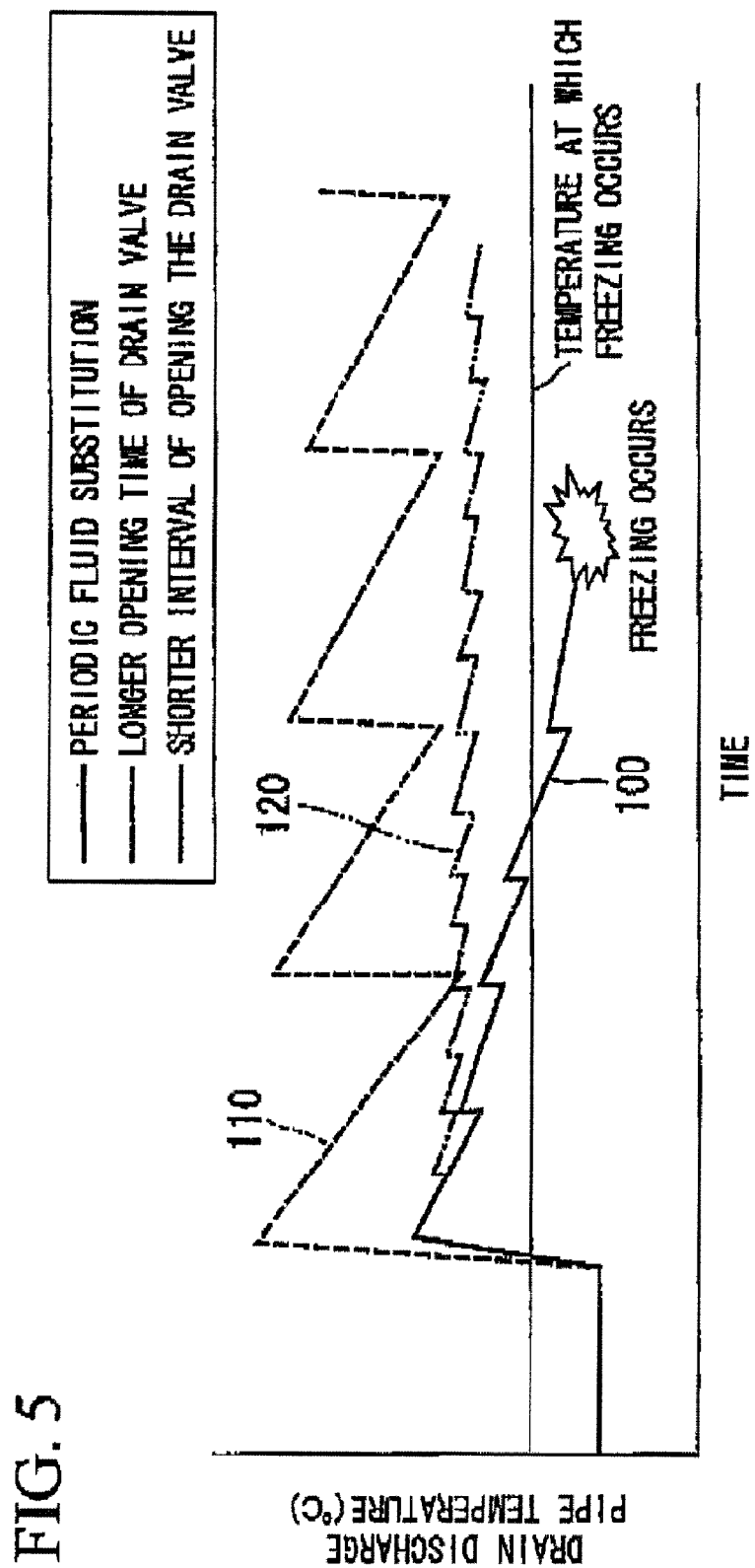
FIG. 5 is a graph showing a change in a temperature of a drain discharge pipe according to an aspect of the present invention.

FIG. 5 shows the change in the temperature of the drain ejection pipe 36. As indicated in FIG. 5, when the opening and closing operation of the drain valve 51 is controlled with the timing of the periodic fluid substitution, the temperature of the drain ejection pipe 36 gradually drops with the passage of time, and falls below the temperature at which freezing occurs (see line 100). On the other hand, when the opening time of the drain valve 51 per opening is increased (see line 110), and when the interval of the opening of the drain valve 51 is shortened (see line 120), the temperature of the drain ejection pipe 36 fluctuates within a predetermined range, but will not fall below the temperature at which freezing occurs. In other words, the warming-up capacity of the drain ejection pipe 36 can be enhanced.

In addition, in step S15, when there is a possibility that the anode gas (hydrogen) concentration of the dilution box 31 will increase, the air compressor 33 may be driven, the electromagnetic valve 57 may be opened, and air may be supplied to the dilution box 31.

In step S16, it is determined whether or not the ignition switch has been turned off. When the ignition switch has been turned off, the procedure is terminated. When the ignition switch has not been turned off, the procedure moves on to step S17.

In step S17, the elevated temperature condition determination unit 49 of the control device 45 determines whether or not the warming up of the drain ejection pipe 36 has been completed. When the warming up has been completed, the procedure moves on to step S18. When the warming up has not been completed, the procedure moves back to step S14, and the amount of drainage continues to be increased.

Figure 6:
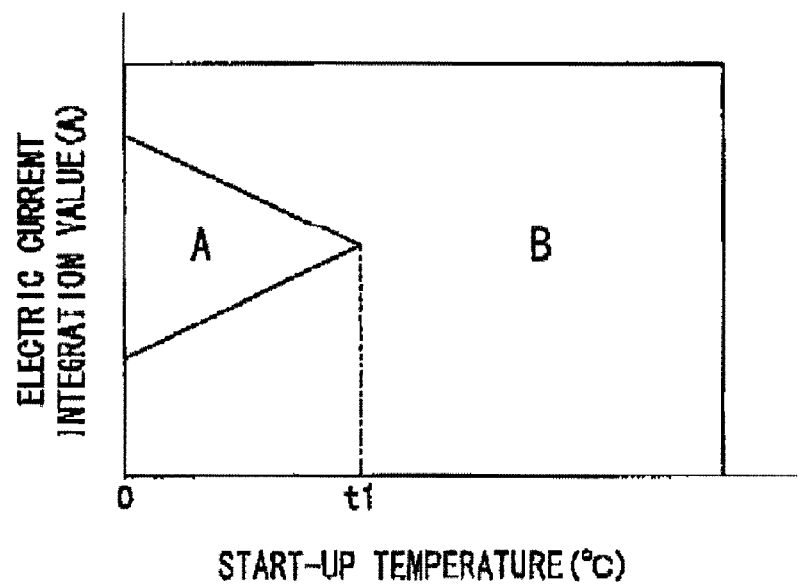
FIG. 6 is a graph used to determine a warming condition of a drain discharge pipe according to an aspect of the present invention.

Here, whether or not the warming up of the drain ejection pipe 36 has been completed is determined based on FIG. 6. As indicated in FIG. 6, a determination of whether or not the warming up of the drain ejection pipe 36 has been completed is made based on the start-up temperature of the fuel cell system 10 and the electric current accumulation value of the electricity generated by the fuel cell 11. In particular, within the region A, it is determined that the warming up of the drain ejection pipe 36 has not been completed. Within the region B, it is determined that the warming up of the drain ejection pipe 36 has been completed. When the start-up temperature exceeds t1 (for example, 0° C.), it is determined that the warming up has been completed, regardless of the electric current accumulation value. When the start-up temperature is less than or equal to t1, it is determined whether or not the warming up has been completed based on the electric current accumulation value. When the start-up temperature is less than or equal to t1 and the electric current accumulation value is small, only a small amount of water is generated, and therefore it is determined that the warming up has been completed.

In step S18, the warming up of the drain ejection pipe 36 has been completed. Therefore, based on the instruction of the periodic fluid substitution execution unit 50 of the control device 45, the control of the opening and closing of the drain valve 51 and the purge valve 52 is returned to the state of the periodic fluid substitution, and the procedure moves on to step S19.

In step S19, it is determined whether or not the ignition switch is turned off. When the ignition switch is turned off, the procedure is terminated. When the switch is not turned off, step S19 is repeated until the ignition switch is turned off.

According to the present embodiment, after the start up of the fuel cell system 10, when the low temperature condition determination unit 47 determines whether or not the fuel cell system 10 is in a low temperature condition, and when it is determined that the fuel cell system 10 is in a low temperature condition, the amount of drainage discharged from the drain valve 51 is configured to be greater than the amount of drainage during a periodic fluid substitution. Therefore, the warming up capacity of the anode offgas ejection pipe 35 and the drain ejection pipe 36 may be enhanced. Moreover, it is possible to prevent the freezing of the anode offgas ejection pipe 35 and the drain ejection pipe 36.

In particular, based on an instruction by the blowdown valve opening-closing control unit 48 of the control device 45, the opening time T1 of the drain valve 51 per opening is controlled to be longer than the opening time T2 during the periodic fluid substitution execution unit. Therefore, the amount of drainage ejected when the drain valve 51 opens once may be increased. Hence, the warming up capacity of the anode offgas ejection pipe 35 and the drain ejection pipe 36 may be enhanced. Further, the freezing of the anode offgas ejection pipe 35 and the drain ejection pipe 36 may be prevented.

Alternatively, based on an instruction by the blowdown valve opening-closing control unit 48 of the control device 45, the interval T3 of each opening of the drain valve 51 may be set to be shorter than the opening time T4 during a periodic fluid substitution. As a result, the opening time of the drain valve 51 per unit of time may be increased, and the amount of drainage may be increased. Hence, the warming up capacity of the anode offgas ejection pipe 35 and the drain ejection pipe 36 may be enhanced. Further, the freezing of the anode offgas ejection pipe 35 and the drain ejection pipe 36 may be prevented.

In addition, when the amount of drainage increases, the anode gas concentration of the dilution box 31 may increase. Accordingly, a configuration is made so that the cathode gas may be supplied from the dilution gas supplying pipe 56 to the dilution box 31. In this way, the anode gas concentration inside the dilution box 31 may be prevented with reliability.

In addition, the control device 45 comprises a freeze determination unit 46 which determines whether or not the drain valve 51 is frozen. A configuration is made so that the amount of drainage from the drain valve 51 is increased only when it is determined that the drain valve 51 is not frozen, i.e., when the drain valve 51 will operate with certainty. Therefore, the drain valve 51 is prevented from being damaged. At the same time, the drainage may be ejected from the drain valve 51 with reliability, and a freezing may be prevented.

Further, when a fluid substitution is performed between the anode offgas ejection pipe 35 and the drain ejection pipe 36 by increasing the amount of drainage ejected from the drain valve 51, a fluid substitution is performed after prohibiting a periodic fluid substitution from the purge valve 52. As a result, the amount of drainage ejected by the drain valve 51 may be increased with reliability. Therefore, the warming up capacity of the anode offgas ejection pipe 35 and the drain ejection pipe 36 may be enhanced. Further, the freezing of the anode offgas ejection pipe 35 and the drain ejection pipe 36 may be prevented.

Moreover, based on the instruction by the elevated temperature condition determination unit 49 of the control device 45, a configuration is made so that an increase in the amount of drainage is terminated when it is determined that the temperature of the anode offgas ejection pipe 35 and the drain ejection pipe 36 has increased to be higher than or equal to a predetermined temperature. As a result, the warming up capacity of the anode offgas ejection pipe 35 and the drain ejection pipe 36 may be enhanced. Further, the freezing of the anode offgas ejection pipe 35 and the drain ejection pipe 36 may be prevented.

Incidentally, in step S14 according to the present embodiment, a periodic purge was prohibited so that a purge cannot be performed. However, a configuration is possible in which a periodic purge is not completely prohibited but is only restricted so that the amount of purge is less than the periodic purge. In this case, the anode gas concentration inside the dilution box 31 needs to be adjusted.

Second Embodiment

Next, a second embodiment of a fuel cell system according to the present invention is described with reference to FIGS. 7 and 8. Incidentally, the present second embodiment is different from the first embodiment with respect to a draining and purging method of the fuel cell system. A configuration of the fuel cell system according to the present second embodiment is approximately the same as the configuration according to the first embodiment. Therefore, same reference numerals are used to describe the same components, and detailed descriptions are omitted.

[Draining and Purging Method of A Fuel Cell System]

Hereinafter, a draining and purging method of a fuel cell system 10 according to the present embodiment is described.

Figure 7:
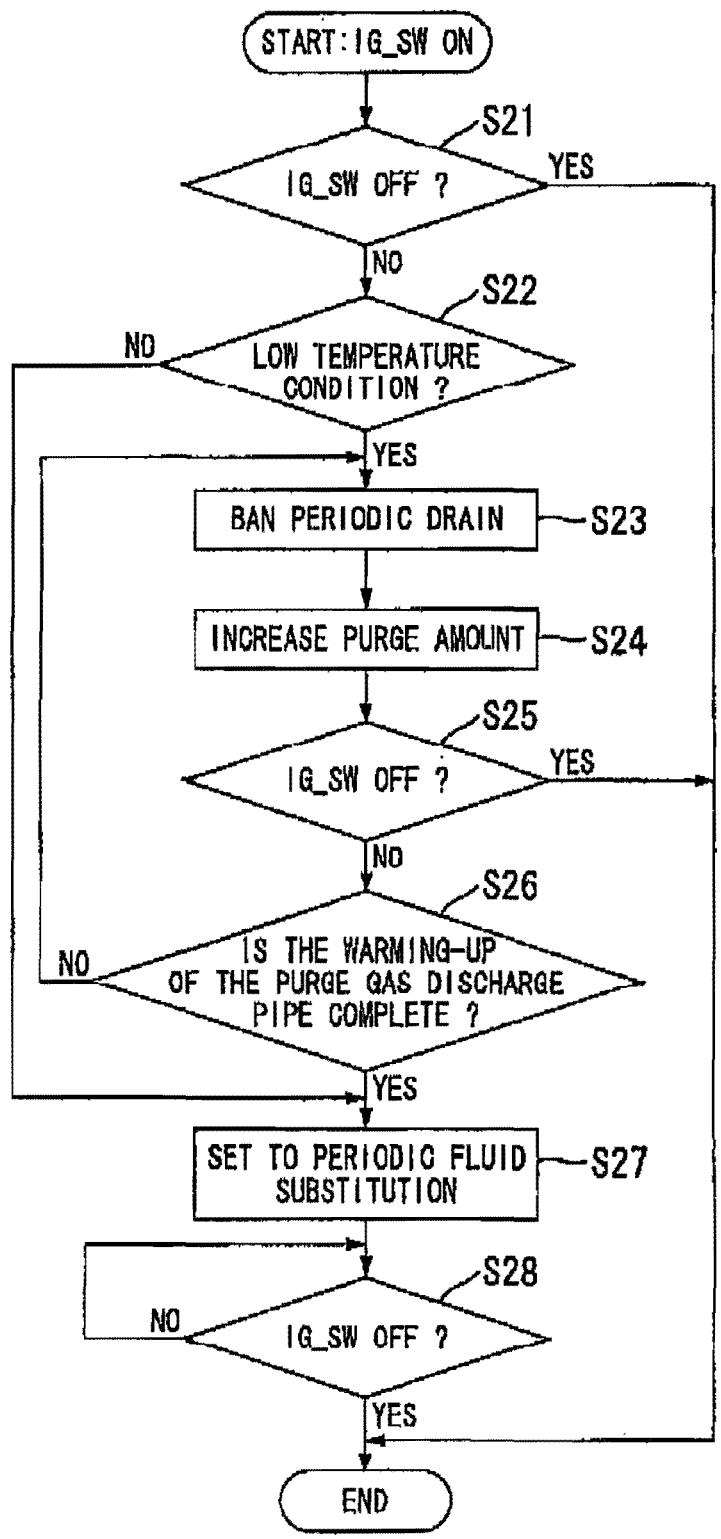
FIG. 7 is a flow chart indicating a draining and purging method of a fuel cell system according to a second embodiment of the present invention.

FIG. 7 is a flowchart representing a draining and purging method of the fuel cell system 10.

As indicated in FIG. 7, the flowchart begins from a condition in which an ignition switch (not diagrammed) is turned on. The ignition switch is a seizing signal of the fuel cell system 10.

In step S21, it is determined whether or not the ignition switch has been turned off. When the ignition switch has been turned off, the procedure is terminated. When the ignition switch has not been turned off, the procedure moves on to step S22.

In step S22, the low temperature condition determination unit 47 of the control device 45 determines whether or not the fuel cell system 10 is exposed to a low temperature condition. When it is determined that the fuel cell system 10 is in a low temperature condition, the procedure moves on to step S23.

When it is determined that the fuel cell system 10 is not in a low temperature condition, the procedure moves on to step S27.

Here, when it is determined that the fuel cell system 10 is in a low temperature condition, it is determined that a freezing of generated water, discharged from the fuel cell 11 immediately after the start up of the fuel cell system 10, may occur at the anode offgas discharge pipe 35, the drain ejection pipe 36, and the purge gas ejection pipe 37 when the fuel cell system 10 is activated as usual at this state. According to an instruction by a blowdown valve opening-closing control unit 48 of the control unit 45, the opening and closing control of the drain valve 51 and the purge valve 52 is set to be different from a control during a periodic fluid substitution execution unit.

In particular, in step S23, a periodic drain is prohibited, and the procedure moves on to step S24. In other words, the drain valve 51 is kept closed so that a drainage cannot be ejected from the drain ejection pipe 36.

In step S24, the amount of purge ejected from the purge gas ejection pipe 37 per unit of time is increased. In particular, the operation shown in FIG. 4 is applied to the purge valve 52. The opening time T1 of the purge valve 52 per opening may be set to be longer than the opening time T2 during a periodic fluid substitution. As another possibility, the opening time of the drain valve 52 per opening may be set to be equal to the opening time T2 during a periodic fluid substitution, while the interval T3 of each opening of the valve may be set to be shorter than the opening time T4 during a periodic fluid substitution. According to this configuration, not only purge gas but also the generated water flowing out from the catch tank 53 is ejected from the purge gas ejection pipe 37 to the dilution box 31. The generated water is a warm water with a temperature of approximately 70° C. when the generated water is discharged from the fuel cell 11. Therefore, by increasing the amount of drainage, the warming-up capacity of the purge gas ejection pipe 37 is enhanced. Thus, in a short amount of time, it is possible to prevent the purge gas ejection pipe 37 from freezing.

In addition, the change in the temperature of the purge gas ejection pipe 37 is approximately the same as the change in the temperature shown in FIG. 5. In other words, when the opening and closing operation of the purge valve 52 is controlled with the timing of the periodic fluid substitution, the temperature of the purge gas ejection pipe 37 gradually drops with the passage of time, and falls below the temperature at which freezing occurs (see line 100). On the other hand, when the opening time of the purge valve 52 per opening is increased (see line 110), and when the interval of the opening of the purge valve 52 is shortened (see line 120), the temperature of the purge gas ejection pipe 37 fluctuates within a predetermined range, but will not fall below the temperature at which freezing occurs. In other words, the warming-up capacity of the purge gas ejection pipe 37 can be enhanced.

Further, in step S24, when the anode gas (hydrogen) concentration of the dilution box 31 is likely to increase, the air compressor 33 may be driven, the electromagnetic valve 57 may be opened, and air may be supplied to the dilution box 31.

In step S25, it is determined whether or not the ignition switch has been turned off. When the ignition switch has been turned off, the procedure is terminated. When the ignition switch has not been turned off, the procedure moves on to step S26.

In step S26, the elevated temperature condition determination unit 49 of the control device 45 determines whether or not the warming up of the purge gas ejection pipe 37 has been completed. When the warming up has been completed, the procedure moves on to step S27. When the warming up has not bee completed, the procedure moves back to step S23, and the amount of drainage continues to be increased.

Figure 8:
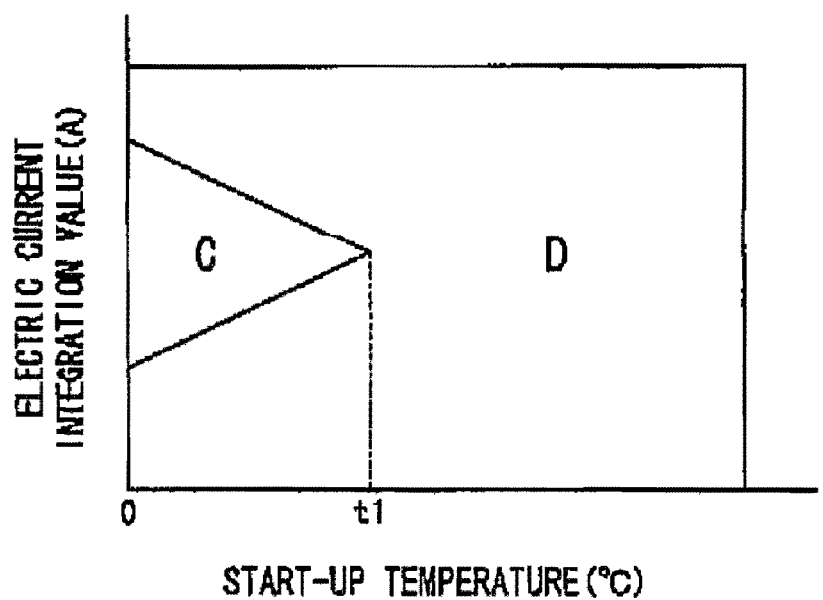
FIG. 8 is a graph used to determine a warming condition of a purge gas discharge pipe according to a second embodiment of the present invention.

Here, whether or not the warming up of the purge gas ejection pipe 37 has been completed is determined based on FIG. 8. As indicated in FIG. 8, a determination of whether or not the warming up of the purge gas ejection pipe 37 has been completed is made based on the start-up temperature of the fuel cell system 10 and the electric current accumulation value of the electricity generated by the fuel cell 11. In particular, within the region C, it is determined that the warming up of the purge gas ejection pipe 37 has not been completed. Within the region D, it is determined that the warming up of the purge gas ejection pipe 37 has been completed. When the start-up temperature exceeds t1 (for example, 0° C.), it is determined that the warming up has been completed, regardless of the electric current accumulation value. When the start-up temperature is less than or equal to t1, it is determined whether or not the warming up has been completed based on the electric current accumulation value. When the start-up temperature is less than or equal to t1 and the electric current accumulation value is small, only a small amount of water is generated, and therefore it is determined that the warming up has been completed.

In step S27, the warming up of the purge gas ejection pipe 37 has been completed. Therefore, based on the instruction of the periodic fluid substitution execution unit 50 of the control device 45, the control of the opening and closing of the drain valve 51 and the purge valve 52 is returned to the state of the periodic fluid substitution, and the procedure moves on to step S28.

In step S28, it is determined whether or not the ignition switch is turned off. When the ignition switch is turned off, the procedure is terminated. When the switch is not turned off, step S28 is repeated until the ignition switch is turned off.

According to the present embodiment, after the start up of the fuel cell system 10, when the low temperature condition determination unit 47 determines whether or not the fuel cell system 10 is in a low temperature condition, and when it is determined that the fuel cell system 10 is in a low temperature condition, the amount of drainage discharged from the purge valve 52 is configured to be greater than the amount of drainage during a periodic fluid substitution. Therefore, the warming up capacity of the anode offgas ejection pipe 35 and the purge gas ejection pipe 37 may be enhanced. Moreover, it is possible to prevent the freezing of the anode offgas ejection pipe 35 and the purge gas ejection pipe 37.

In particular, based on an instruction by the blowdown valve opening-closing control unit 48 of the control device 45, the opening time T1 of the purge valve 52 per opening is controlled to be longer than the opening time T2 during the periodic fluid substitution execution unit. Therefore, the amount of drainage ejected when the purge valve 52 opens once may be increased. Further, since the drain valve 51 is closed, the drain flowing out from the catch tank 53 is led to the purge gas ejection pipe 37. Hence, the warming up capacity of the anode offgas ejection pipe 35 and the purge gas ejection pipe 37 may be enhanced. Further, the freezing of the anode offgas ejection pipe 35 and the purge gas ejection pipe 37 may be prevented.

Alternatively, based on an instruction by the blowdown valve opening-closing control unit 48 of the control device 45, the interval T3 of each opening of the purge valve 52 may be set to be shorter than the opening time T4 during a periodic fluid substitution. As a result, the opening time of the purge valve 52 per unit of time may be increased, and the amount of purging may be increased. Further, since the drain valve 51 is closed, the drain flowing out from the catch tank 53 is led to the purge gas ejection pipe 37. Hence, the warming up capacity of the anode offgas ejection pipe 35 and the purge gas ejection pipe 37 may be enhanced. Further, the freezing of the anode offgas ejection pipe 35 and the purge gas ejection pipe 37 may be prevented.

Further, when a fluid substitution is performed between the anode offgas ejection pipe 35 and the purge gas ejection pipe 37 by increasing the amount of drainage ejected from the purge valve 52, a fluid substitution is performed after prohibiting a periodic fluid substitution from the drain valve 51. As a result, the amount of purging from the purge valve 52 may be increased with reliability. Further, since the drain valve 51 is closed, the drainage flowing out from the catch tank 53 is led to the purge gas ejection pipe 37. Therefore, the warming up capacity of the anode offgas ejection pipe 35 and the purge gas ejection pipe 37 may be enhanced. Further, the freezing of the anode offgas ejection pipe 35 and the purge gas ejection pipe 37 may be prevented.

Moreover, based on the instruction by the elevated temperature condition determination unit 49 of the control device 45, a configuration is made so that an increase in the amount of purging is terminated when it is determined that the temperature of the anode offgas ejection pipe 35 and the purge gas ejection pipe 37 has increased to be higher than or equal to a predetermined temperature. As a result, the warming up capacity of the anode offgas ejection pipe 35 and the purge gas ejection pipe 37 may be enhanced. Further, the freezing of the anode offgas ejection pipe 35 and the purge gas ejection pipe 37 may be prevented.

Incidentally, in step S23 according to the present embodiment, a periodic drain was prohibited so that a drainage cannot be ejected from the drain ejection pipe 36. However, a configuration is possible in which a periodic drain is not completely prohibited but is only restricted so that the amount of draining is less than the periodic drain. In this case, the anode gas concentration inside the dilution box 31 needs to be adjusted.

While a preferred embodiment of the present invention has been described above, it should be understood that these are exemplary of the invention and are not to be considered as limiting the present invention. Additions, omissions, substitutions, and other modifications can be made without departing from the scope of the present invention. The invention is not to be considered as being limited by the foregoing description, and is only limited by the scope of the appended claims.

For example, in the present embodiment, a configuration has been described in which a an anode offgas ejection pipe comprises a temperature sensor, which detects the temperature of the fuel cell, the temperature sensor may directly detect the temperature of the fuel cell. In addition, the temperature sensor may be provided not only at one location, but at a plurality of locations. In such a case, a detection of either temperature may be made, or an average value of each of the temperature sensors may be obtained.

Further, in the present embodiment, a configuration has been made such that the processing is terminated when the warming up has not been completed and the ignition switch has been turned off. However, a configuration is also possible in which generation of electricity is forcibly continued until the warming up has been completed.

What is claimed is:

1. A fuel cell system comprising:
   an anode gas flow path supplied with an anode gas;
   a cathode gas flow path supplied with a cathode gas;
   a fuel cell generating electricity by the anode gas being supplied to the anode gas flow path and the cathode gas being supplied to the cathode gas flow path;
   an anode gas supplying unit supplying the anode gas to the anode gas flow path;
   a blowdown valve ejecting fluid from inside the anode gas flow path towards an exterior; and
   a control unit which controls the anode gas supplying unit and the blowdown valve, supplies the anode gas from the anode gas supplying unit to the anode gas flow path, and performs a periodic fluid substitution by opening the blowdown valve periodically, wherein
   the blowdown valve comprises at least a first blowdown valve provided in the anode gas flow path and a second blowdown valve provided at a lower stream side of the first blowdown valve; and
   the control unit comprises a low temperature condition determination unit programmed to determine whether or not a low temperature condition is present after the fuel cell is activated, and when the low temperature condition determination unit determines that a low temperature condition is present, the control unit is programmed to perform fluid substitution within the anode gas flow path by increasing an amount of fluid ejected from the first blowdown valve or the second blowdown valve to be greater than an amount of fluid ejected during the periodic fluid substitution.

2. The fuel cell system according to claim 1, wherein
   when the low temperature condition determination unit determines that a low temperature condition is present, the control unit performs a control so that an opening time of the blowdown valve per opening is longer than an opening time during the periodic fluid substitution execution unit.

3. The fuel cell system according to claim 1, wherein
   when the low temperature condition determination unit determines that a low temperature condition is present, the control unit performs a control so that a time interval between a consecutive opening of the blowdown valve is shorter than a time interval between a consecutive opening during the periodic fluid substitution.

4. The fuel cell system according to any one of claim 1, 2, or 3, further comprising
   a dilution unit diluting a concentration of the anode gas ejected from the blowdown valve; and
   a cathode gas dilution flow path supplying the cathode gas to the dilution unit, wherein
   the control unit performs a control so that a flow volume of the cathode gas supplied to the cathode gas dilution flow path is increased according to an increase in the amount of fluid ejected from the first blowdown valve or the second blowdown valve.

5. The fuel cell system according to any one of claim 1, 2, or 3, wherein
   the control unit comprises a freeze determination unit determining whether the first blowdown valve is in a frozen state, and when the freeze determination unit determines that the first blowdown valve is not in a frozen state, fluid substitution is performed within the anode gas flow path by increasing the amount of fluid ejected from the first blowdown valve.

6. The fuel cell system according to claim 5, wherein
   the control unit performs fluid substitution within the anode gas flow path by increasing the amount of fluid ejected from the first blowdown valve after restricting the periodic fluid substitution from the second blowdown valve.

7. The fuel cell system according to any one of claim 1, 2, or 3, wherein
    the control unit performs fluid substitution within the anode gas flow path by increasing an amount of fluid ejected from the second blowdown valve after restricting the periodic fluid substitution from the first blowdown valve.

8. The fuel cell system according to any one of claim 1, 2, or 3, wherein
    the control unit comprises an elevated temperature condition determination unit determining a warm-up condition of the anode gas flow path using a start-up temperature of the fuel cell and an electric generation current accumulation value of the fuel cell, and after the amount of fluid ejected from the first blowdown valve or the second blowdown valve is increased and when the elevated temperature condition determination unit determines that a temperature of the anode gas flow path has increased to be greater than or equal to a predetermined temperature, the control unit stops an increase in the amount of fluid ejected from the first blowdown valve or the second blowdown valve.

* * * * *